Oct. 31, 1967   E. S. GRANATEK ET AL   3,350,266
ANTACID COMPOSITION COMPRISING ALUMINUM
HYDROXIDE, MAGNESIUM HYDROXIDE
AND MAGNESIUM GLUCONATE
Filed June 4, 1964   4 Sheets-Sheet 1

EDMUND S. GRANATEK
ALPHONSE P. GRANATEK  *INVENTORS.*

BY CURTIS W. CARLSON
RICHARD H. BRINK
ROBERT B. SIMONTON
HERBERT W. TAYLOR JR.
ATTORNEYS

Oct. 31, 1967  E. S. GRANATEK ETAL  3,350,266
ANTACID COMPOSITION COMPRISING ALUMINUM
HYDROXIDE, MAGNESIUM HYDROXIDE
AND MAGNESIUM GLUCONATE
Filed June 4, 1964  4 Sheets-Sheet 3

EDMUND S. GRANATEK
ALPHONSE P. GRANATEK  *INVENTORS.*

*BY* CURTIS W. CARLSON
RICHARD H. BRINK
ROBERT B. SIMONTON
HERBERT W. TAYLOR JR.
*ATTORNEYS*

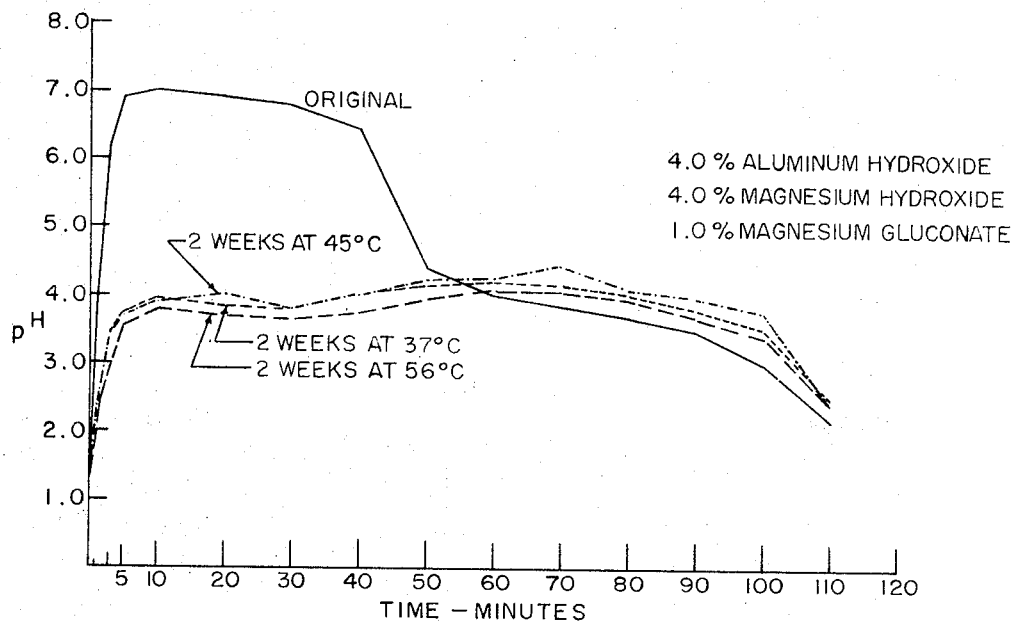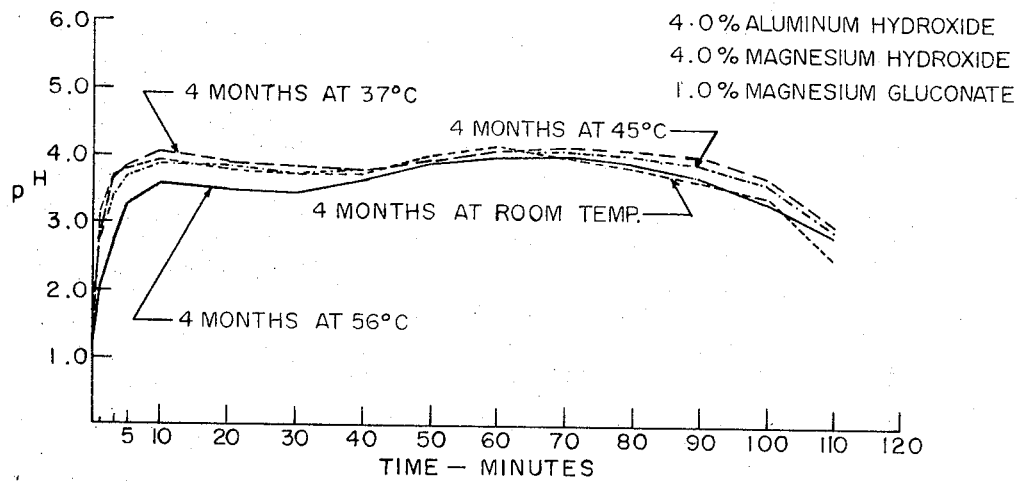

United States Patent Office 3,350,266
Patented Oct. 31, 1967

3,350,266
ANTACID COMPOSITION COMPRISING ALUMINUM HYDROXIDE, MAGNESIUM HYDROXIDE AND MAGNESIUM GLUCONATE
Edmund Stanley Granatek and Alphonse P. Granatek, Baldwinsville, N.Y., assignors to Bristol-Myers Company, New York, N.Y., a corporation of Delaware
Filed June 4, 1964, Ser. No. 372,559
1 Claim. (Cl. 167—55)

This invention relates to a novel antacid composition. More particularly, this invention relates to a novel aqueous antacid suspension. In another aspect, this invention relates to a novel method of treating gastric hyperacidity. In still another aspect, this invention relates to a method of stabilizing an antacid composition.

Antacid compositions are used for the treatment of gastric hyperacidity caused by excess acid in the stomach and peptic ulcers. Such compositions are well-known in the art and are used specifically to neutralize and/or buffer the gastric fluids.

Ideally, an antacid composition should have high neutralizing capacity over a long period of time and be rapid in initial effect after administration. In general, the pH of the gastric fluids should be maintained within the range of 3.0 to 5.0 by the antacid composition for about 1 to 2 hours, which is generally considered the stomach emptying time. Strongly alkaline antacids are undesirable in that they raise the pH of the gastric fluids to neutrality or near neutrality. This over-neutralizing of the gastric fluids in the stomach causes a phenomenon known as acid rebound, a condition where an increased amount of acid is secreted by the stomach to compensate for the high pH of the gastric fluids. This condition is particularly undesirable. In addition, an antacid preferably should be non-systemic, i.e., not absorbed from the gastrointestinal tract to prevent a condition known as alkalosis from occurring which is caused by the absorption of the sodium ion into the blood, thereby increasing the alkalinity of the blood. An antacid should, in addition to the foregoing requisites, be palatable and pharmaceutically elegant.

Accordingly, an object of the present invention is to provide an antacid composition that has high neutralizing capacity.

Another object of the present invention is to provide an antacid composition that is rapid in initial effect and active over a long period of time.

A further object of the present invention is to provide an antacid composition that is non-systemic and does not cause acid rebound.

A still further object of the present invention is to provide an antacid composition that is palatable and pharmaceutically elegant.

An additional object of the present invention is to provide a method of treating gastric hyperacidity and peptic ulcer.

Another object of the present invention is to provide a method of stabilizing an antacid composition.

Other objects and advantages of this invention will become apparent from the following detailed description thereof when read in conjunction with the accompanying drawings, in which:

FIGURE 7 is a graph showing the effect of storage for 2 weeks at 37° C., 45° C. and 56° C. on an antacid composition with magnesium gluconate;

FIGURE 8 is a graph showing the effect of storage for 4 months at room temperature, 37° C., 45° C. and 56° C. on an antacid composition with magnesium gluconate.

Figure 1:
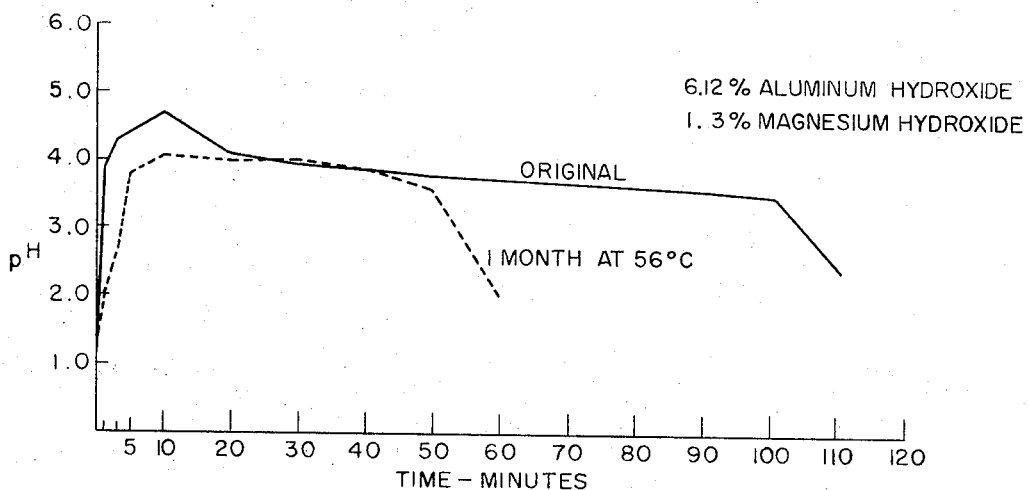
FIGURE 1 is a graph showing the effect of storage for 1 month at 56° C. on an antacid composition without magnesium gluconate.

The objects of this invention have been accomplished by the provision of an aqueous antacid suspension which comprises water, aluminum hydroxide, magnesium hydroxide, and about 0.5 to 2.0 percent by weight of magnesium gluconate.

While antacid compositions containing aluminum hydroxide and magnesium hydroxide are known in the art, it has been found that by the inclusion of about 0.5 to 2.0 percent by weight of magnesium gluconate in such compositions, an antacid composition is produced having novel and improved therapeutic properties.

The antacid composition of the present invention has been found to have a duration of neutralization of from about 100 to 110 minutes, during which period the pH of the gastric fluids is maintained within the range of 3 to 5. The duration of neutralization surprisingly decreases only slightly during storage at elevated temperatures, e.g. 37° C., 45° C. and 56° C. The excellent storage stability of the composition of this invention was particularly surprising in view of the rather poor storage stability of similar antacid compositions that do not contain magnesium gluconate. In addition, the antacid composition of this invention is fluid when prepared and remains fluid after prolonged storage. In contrast, compositions containing similar quantities of aluminum hydroxide and magnesium hydroxide and not containing magnesium gluconate become very viscous after storage and in some cases, e.g., 8 percent aluminum hydroxide and 8 percent magnesium hydroxide suspensions, are very viscous when prepared. Hence, the addition of magnesium gluconate to a suspension containing aluminum hydroxide and magnesium hydroxide also reduces and stabilizes the viscosity of the suspension.

The antacid composition of this invention is palatable and is rapidly effective after administration; however, the composition does not over-neutralize the gastric fluids. In general, the maximum pH produced after administration of the composition does not exceed 5. Thus, the composition does not initially cause such an increase in pH that the acid rebound occurs.

In addition, the composition of the present invention is not absorbed from the gastrointestinal tract into the blood.

In preparing the aqueous antacid suspension of this invention, aluminum hydroxide, magnesium hydroxide and magnesium gluconate are mixed with a sufficient quantity of water to form a fluid suspension. It is preferred that the suspension contain about 4 to 8 percent by weight of aluminum hydroxide, 1 to 8 percent by weight of magnesium hydroxide and 0.5 to 2.0 percent by weight of magnesium gluconate. Preferably, the amount of magnesium hydroxide in the antacid suspension should be equal to, or less than, the amount of aluminum hydroxide. The preferred antacid suspensions of the present invention are those containing about 4 percent by weight of aluminum hydroxide, 4 percent by weight of magnesium hydroxide, and 1.0 percent by weight of magnesium gluconate; and 6.12 percent by weight of aluminum hydroxide, 1.3 percent by weight of magnesium hydroxide and 1.0 percent by weight of magnesium gluconate.

If it should become desirable to increase the viscosity of the suspension, a portion of the magnesium hydroxide may be replaced with magnesium oxide. Generally not over 1.0 percent of the magnesium hydroxide should be replaced with magnesium oxide to prevent the suspension from becoming excessively viscous.

Aluminum hydroxide, magnesium hydroxide and magnesium gluconate may be used in any of the commercially available forms in the preparation of the antacid suspension. Aluminum hydroxide and magnesium hydroxide must be used in active forms. For example, aluminum hydroxide in the form of an amorphous powder or an aqueous gel, magnesium hydroxide in the form of an amorphous powder or an aqueous gel, and magnesium gluconate in powdered form or as an aqueous solution may be conveniently used to prepare the composition of this invention. However, the aqueous gel forms of aluminum hydroxide and magnesium hydroxide are preferred. If desired, magnesium gluconate can be conveniently prepared by reacting magnesium hydroxide with gluconic acid, or glucono-delta-lactone. The reaction can be carried out during the preparation of the antacid suspension since magnesium hydroxide is one of the constituents of the suspension, although it is preferred to prepare the magnesium gluconate beforehand. If desired, sodium gluconate, potassium gluconate or calcium gluconate can be substituted for magnesium gluconate in the composition.

After the suspension has been prepared, it should be aged to obtain the optimum pharmacological properties. The ageing tends to reduce the initial neutralization produced by the antacid so that it does not exceed a pH of about 5. The ageing is conveniently carried out by storing the suspension at room temperature for about 1 to 2 weeks or at elevated temperatures. Heating the antacid suspension at high temperatures, e.g., 250° F., 15 p.s.i., for 15 minutes will shorten the ageing time. Hence, if desired, the ageing of the suspension may be accomplished during sterilization.

The composition of the present invention is in the form of an aqueous suspension for oral use. The suspension is stable upon storage for long periods of time at low and elevated temperatures, e.g., 56° C. To this aqueous suspension, there may be added pharmaceutical additives, preservatives, fillers, suspending or dispersing agents, diluents, lubricants, coloring, sweetening agents and the like. For example, small amounts of methyl paraben (methyl ester of p-hydroxybenzoic acid), propyl paraben (propyl ester of p-hydroxybenzoic acid), sodium saccharin, sodium sucaryl, peppermint, spearmint, and sweet birch flavors may be added to the suspension.

The composition of this invention, when taken orally, is effective in the treatment of gastric hyperacidity and peptic ulcers. The administration of an effective amount of the composition will maintain the pH of the gastric fluids in the stomach within the range of 3 to 5 for about 2 hours.

The aqueous antacid suspension of this invention may be used in gastric hyperacidity or peptic ulcer therapy either alone or in combination with other ingredients. For example, it may be used in combination with protective coating agents such as a nonreactive gel (e.g. aluminum hydroxide, magnesium trisilicate), or an alkali soluble hydrophylic colloid, (e.g. carboxymethyl cellulose, alginates, carboxypolymethylene, cellulose acetate phthalate); an antispasmodic such as "Centrine" (aminopentamide) or belladona alkaloids; an antisecretory; a transquilizer such as reserpine or meprobamate; an antiflatulent such as methylpolysiloxane; a sedative such as phenobarbital; a local anesthetic such as "Xylocaine" (2-diethylamino-2',6'-aceto-xylidide); an antibiotic such as tetracycline hydrochloride or a penicillin; or a compatible combination thereof.

If desired, the water may be removed from the antacid suspension by conventional means and the solids recovered. The solids may be tabletted; encapsulated into gelatin capsules by conventional means; or resuspended in water to provide a suspension of the desired concentration. The antacid solids of this invention may be formulated along with an analgesic compound such as aspirin and/or acetyl p-aminophenol into an effervescent or a conventional type tablet.

The following examples are intended to illustrate the invention described herein without unduly restricting it.

The antacid compositions contained in the examples were evaluated by the titration procedure of C. Fuchs used in modified form. The C. Fuchs procedure is described in the Drug and Cosmetic Industry, volume 64, page 692, 1949. This procedure is based on an estimate that the human stomach contains an amount of acid equivalent to about 50 ml. of 0.1 N hydrochloric acid shortly after a meal. This is augmented by the secretion of an additional 240 ml. of 0.1 N hydrochloric acid in the following 2 hours. The method of evaluation permits the determination of rate of neutralization, acid-consuming power, and the duration of activity of the antacid.

In carrying out the modified procedure of C. Fuchs, 5 ml. of the antacid is added to 25 ml. of 0.1 N hydrochloric acid. The mixture is stirred continuously at 25° C. and the pH is recorded at the end of the first, third, fifth and tenth minutes. At this time, and at each ten-minute reading thereafter, 1 ml. of 1.0 N hydrochloric acid is added. The procedure is followed for 2 hours, or until the pH drops below 3, at which point, the antacid is assumed to be dissipated.

EXAMPLE 1

*Preparation of aqueous antacid suspension containing 4% aluminum hydroxide, 4% magnesium hydroxide and 2% magnesium gluconate*

37.8 grams of aluminum hydroxide wet gel (J. T. Baker Company, Type 150, Lot 22280, 9.8% aluminum oxide) and 19.2 gm. of magnesium hydroxide (Merck Hydromagma MM No. 1021/314, Lot 32, 31.25% magnesium hydroxide) was dispersed in enough water to make 100 cc. of suspension. Magnesium gluconate (3.0 gm.) was added and the suspension stirred for 10 minutes. The suspension was passed through a 200-mesh screen, and water was added to make 150 cc. of antacid suspension. The suspension was stored at room temperature for two weeks.

The resulting antacid suspension was fluid, and had a neutralizing capacity of greater than 100 minutes as determined by the above-described titration procedure.

EXAMPLE 2

*Preparation of aqueous antacid suspension containing 4% aluminum hydroxide, 4% magnesium hydroxide and 1% magnesium gluconate*

37.8 grams of aluminum hydroxide wet gel (J. T. Baker Company, Type 150, Lot 22280, 9.8% aluminum oxide) and 19.2 gm. of magnesium hydroxide (Merck Hydromagma MM No. 1021/314, Lot 32, 31.25% magnesium hydroxide) was dispersed in enough water to make 100 cc. of suspension. Magnesium gluconate (1.5 gm.) was added and the suspension stirred for 10 minutes. The suspension was passed through a 200-mesh screen and water was added to make 150 cc. of antacid suspension. The suspension was then stored at room temperature for two weeks.

The resulting antacid suspension was fluid, and had a neutralizing capacity of greater than 100 minutes as determined by the above-described titration procedure.

EXAMPLE 3

*Preparation of aqueous antacid suspension containing 6% aluminum hydroxide, 2% magnesium hydroxide and 1% magnesium gluconate*

28.48 grams of aluminum hydroxide wet gel (J. T. Baker Company, Type 150, Lot 22280, 9.8% aluminum oxide) and 6.4 gm. of magnesium hydroxide (Merck Hydromagma MM No. 1021/314, Lot 32, 31.25% magnesium hydroxide) was dispersed in enough water to make 100 cc. of suspension. Magnesium gluconate (1.5 gm.) was added and the suspension stirred for 10 minutes. The suspension was passed through a 200-mesh screen and water was added to make 150 cc. of antacid suspension. The suspension was then stored at room temperature for two weeks.

The resulting antacid suspension was fluid, and had a neutralizing capacity of greater than 100 minutes as determined by the above-described titration procedure.

EXAMPLE 4

*Preparation of aqueous antacid suspension*

To a batching tank containing 500 cc. of purified water U.S.P., was added 0.790 gm. methyl paraben (U.S.P. micronized) and 0.190 gm. propyl paraben (U.S.P micronized) The mixture was heated to 70° C. with stirring and held at this temperature until the parabens were dissolved. The resultant solution was cooled to 25° C. and 0.500 gm. sodium saccharin U.S.P., 5.000 gm. sodium sucaryl, 26.14 gm. aluminum hydroxide wet gel (J. T. Baker Company, Type 150, Lot 22280, 9.8% aluminum oxide) and 40.00 gm. magnesium hydroxide (Merck Hydromagma MM No. 1021/314, Lot 32, 31.25% magnesium hydroxide), were added with mixing. 10 grams of magnesium gluconate was then added and the suspension was stirred rapidly for 30 minutes. After passing the suspension through an Eppenbach Mill, 0.03 cc. flavor blend (6.3 cc. oil of peppermint, 1.8 cc. oil of spearmint, 0.9 cc. oil of sweet birch) and sufficient purified water was added to bring the batch up to 1,000 cc. The suspension was mixed for 30 minutes and then stored at room temperature for two weeks.

The resulting antacid suspension was fluid and had a neutralizing capacity of greater than 100 minutes as determined by the above-described titration procedure.

EXAMPLE 5

*Preparation of aqueous antacid suspension*

To a batching tank containing 500 cc. of purified water U.S.P., was added 0.790 gm. methyl paraben (U.S.P. micronized) and 0.190 gm. propyl paraben (U.S.P micronized) The mixture was heated to 70° C. with stirring and held at this temperature until the parabens were dissolved. The resulting solution was cooled to 25° C. and 0.500 gm. sodium saccharin U.S.P., 5.000 gm. sodium sucaryl, 26.14 gm. aluminum hydroxide wet gel (J. T. Baker Company, Type 150, Lot 22280, 9.8% aluminum oxide), 30.00 gm. magnesium hydroxide (Merck Hydromagma MM No. 1021/314, Lot 32, 31.25% magnesium hydroxide) and 6.900 gm. magnesium oxide (U.S.P., Light, Mallinckrodt, No. 6018) were added with mixing. 10 grams of magnesium gluconate was then added and the suspension was stirred rapidly for 30 minutes. After passing the suspension through an Eppenbach Mill, 0.03 cc. flavor blend (6.3 cc. oil of peppermint, 1.8 cc. oil of spearmint, 0.9 cc. oil of sweet birch) and sufficient purified water was added to bring the batch up to 1,000 cc. The suspension was mixed for 30 minutes and then stored at room temperature for two weeks.

The resulting antacid suspension was fluid, and had a neutralizing capacity of greater than 100 minutes as determined by the above-described titration procedure.

EXAMPLE 6

*Preparation of aqueous antacid suspension*

To a batching tank containing 500 cc. of purified water U.S.P., was added 0.790 gm. methyl paraben (U.S.P. micronized) and 0.190 gm. propyl paraben (U.S.P. micronized). The mixture was heated to 70° C. with stirring and held at this temperature until the parabens were dissolved. The resultant solution was cooled to 25° C. and 2.56 gm. sodium saccharin U.S.P., 12.77 gm. sodium sucaryl, 40.00 gm. aluminum hydroxide paste (Reheis, Type F500, 9.8% aluminum oxide), and 13.00 gm. magnesium hydroxide (Merck Hydromagma MM No. 1021/314, Lot 32, 31.25% magnesium hydroxide) were added with mixing. 10 grams of magnesium gluconate was then added and the suspension was stirred rapidly for 30 minutes. After passing the suspension through an Eppenbach Mill, 0.03 cc. flavor blend (6.3 cc. oil of peppermint, 1.8 cc. oil of spearmint, 0.9 cc. oil of sweet birch) and sufficient purified water was added to bring the batch up to 1,000 cc. The suspension was mixed for 30 minutes and then stored at room temperature for two weeks.

The resulting antacid suspension was fluid, and had a neutralizing capacity of greater than 100 minutes as determined by the above-described titration procedure.

EXAMPLE 7

Two aqueous antacid suspensions were prepared according to the procedures described above, having the following compositions:

*Composition A*

| | Percent |
|---|---|
| Aluminum hydroxide | 6.12 |
| Magnesium hydroxide | 1.3 |
| Water | 92.58 |

*Composition B*

| | Percent |
|---|---|
| Aluminum hydroxide | 6.12 |
| Magnesium hydroxide | 1.3 |
| Magnesium gluconate | 1 |
| Water | 91.58 |

Portions of Compositions A and B were stored for 1 month at 56° C., 3 months at 37° C., and an additional portion of Composition B was stored for 3 months at 56° C. The antacid suspensions were evaluated before storage and after each period of storage by the titration procedure described hereinabove.

Figure 2:
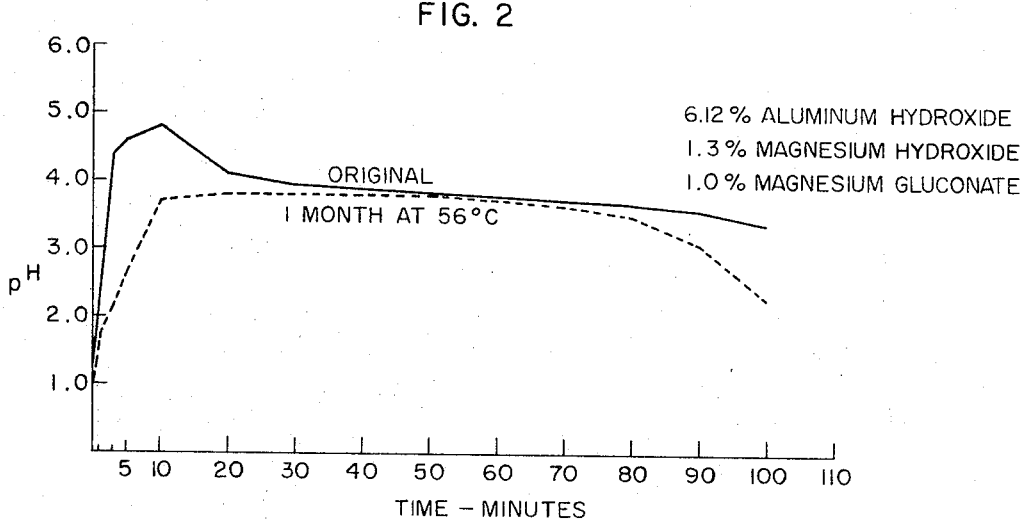
FIGURE 2 is a graph showing the effect of storage for 1 month at 56° C. on an antacid composition with magnesium gluconate.
Figure 3:
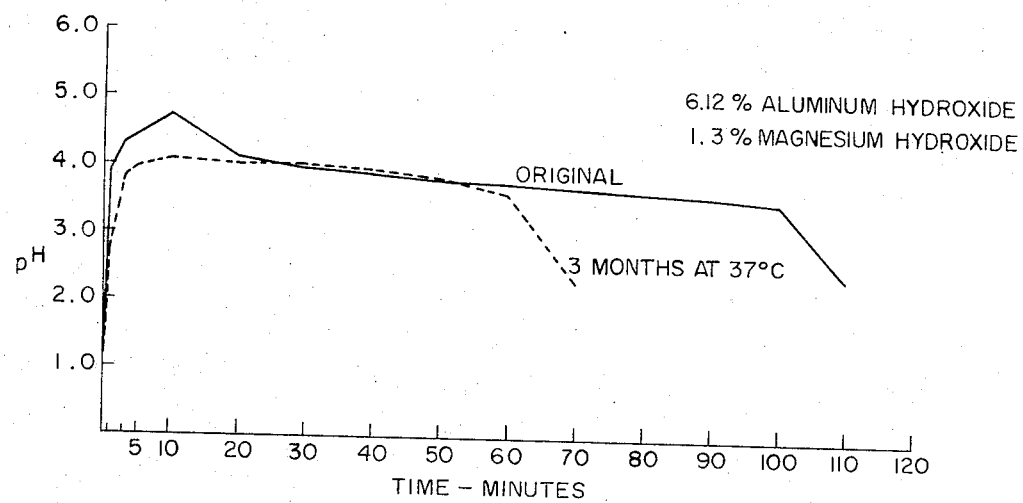
FIGURE 3 is a graph showing the effect of storage for 3 months at 37° C. on an antacid composition without magnesium gluconate.
Figure 4:
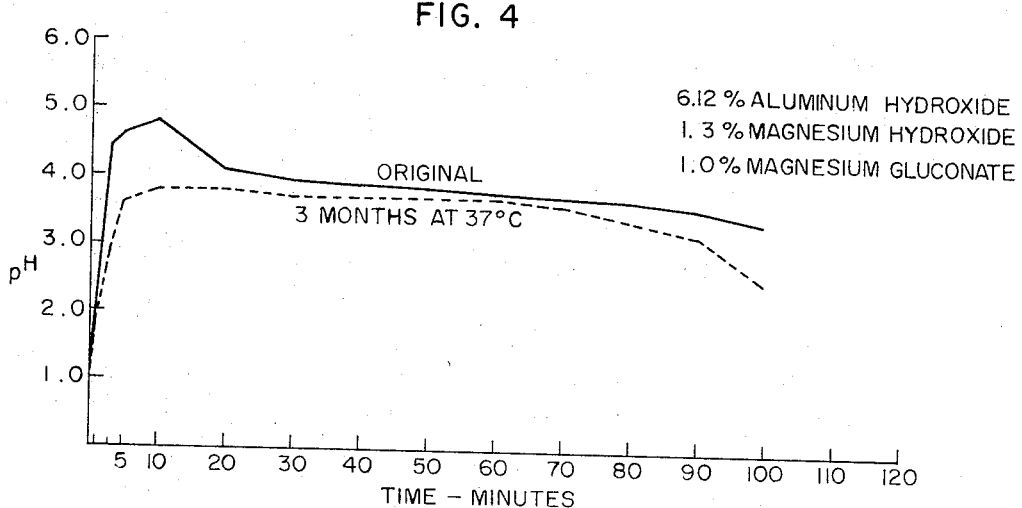
FIGURE 4 is a graph showing the effect of storage for 3 months at 37° C. on an antacid composition with magnesium gluconate.
Figure 5:
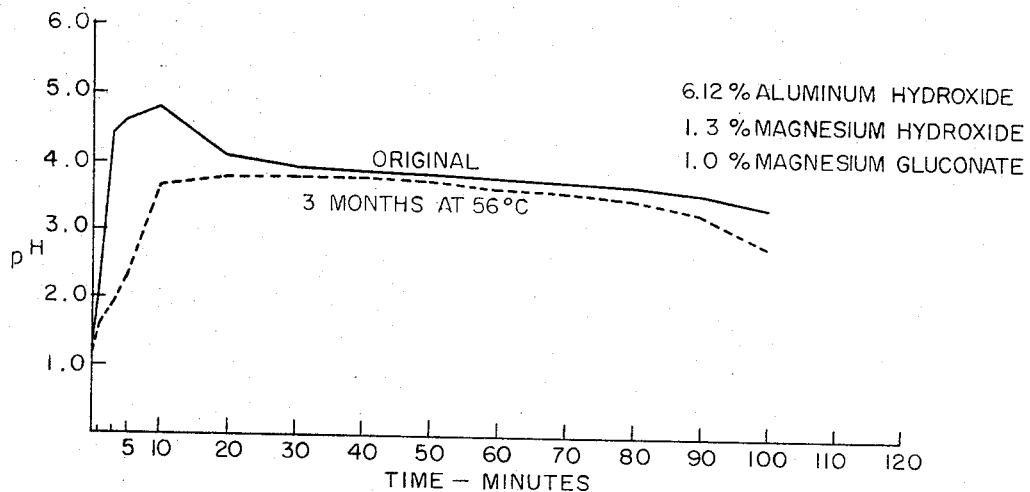
FIGURE 5 is a graph showing the effect of storage for 3 months at 56° C. on an antacid composition with magnesium gluconate.

FIG. 1 shows the neutralization capacity of Composition A before and after storage for 1 month at 56° C. FIG. 2 shows the neutralization capacity of Composition B before and after storage for 1 month at 56° C. FIG. 3 shows the neutralization capacity of Composition A before and after storage for 3 months at 37° C. FIG. 4 shows the neutralization capacity of Composition B before and after storage for 3 months at 37° C. FIG. 5 shows the neutralization capacity of Composition B before and after storage for 3 months at 56° C.

It can be seen by comparing FIGS. 1 and 2 that the duration of neutralization of Composition B, containing magnesium gluconate, was much greater than that of Composition A, which did not contain magnesium gluconate after storage for 1 months at 56° C. A comparison between FIGS. 3 and 4 also shows that Composition B, containing magnesium gluconate, had a greater duration of neutralization after storage for 3 months at 37° C. It is apparent from FIG. 5 that the duration of neutralization of Composition B, containing magnesium gluconate, did not decrease appreciably after storage for 3 months at 56° C. Composition A became very viscous after storage for 1 month at 56° C. while Composition B remained fluid even after storage for 3 months at 56° C. FIGS. 2, 4 and 5 also show that the composition of this invention (Composition B) was rapid in initial effect and did not over-neutralize.

EXAMPLE 8

Two aqueous antacid suspensions were prepared according to the procedures described above, having the following compositions:

*Composition C*

|  | Percent |
|---|---|
| Aluminum hydroxide | 4 |
| Magnesium hydroxide | 4 |
| Water | 92 |

*Composition D*

|  | Percent |
|---|---|
| Aluminum hydroxide | 4 |
| Magnesium hydroxide | 4 |
| Magnesium gluconate | 1 |
| Water | 91 |

Portions of Compositions C and D were stored for 2 weeks at 37° C., 45° C. and 56° C. Additional portions of Composition D were stored for 4 months at room temperature, 37° C., 45° C. and 56° C. The antacid suspensions were evaluated before storage and after each period of storage by the titration procedure described hereinabove.

Figure 6:
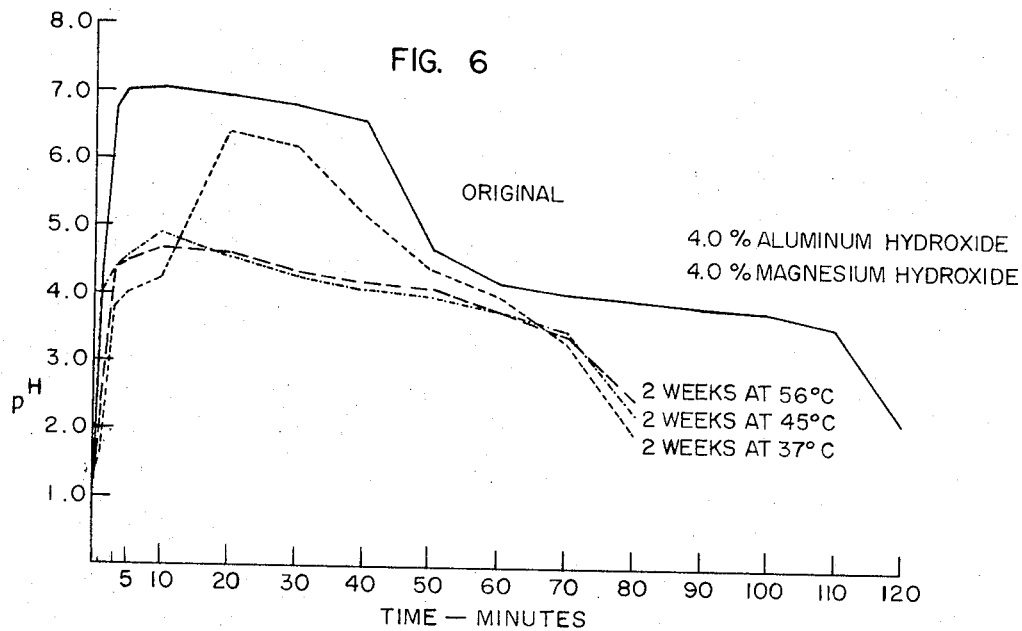
FIGURE 6 is a graph showing the effect of storage for 2 weeks at 37° C., 45° C. and 56° C. on an antacid composition without magnesium gluconate.

FIG. 6 shows the neutralization capacity of Composition C before and after storage for 2 weeks at 37° C., 45° C. and 56° C. FIG. 7 shows the neutralization capacity of Composition D before and after storage for 2 weeks at 37° C., 45° C. and 56° C. FIG. 8 shows the neutralization capacity of Composition D after storage for 4 months at room temperature, 37° C., 45° C. and 56° C.

It can be seen by comparing FIGS. 6 and 7 that the duration of neutralization of Composition D, containing magnesium gluconate, was much greater than that of Composition C, which did not contain magnesium gluconate, for each storage temperature. It is apparent from FIG. 8 that the duration of neutralization of Composition D, containing magnesium gluconate, did not decrease appreciably after storage for 4 months at room temperature, 37° C., 45° C. and 56° C. Composition C was very viscous after 2 weeks of storage at 56° C., while Composition D remained fluid after storage for 4 months at 56°. FIGS. 7 and 8 also show that the composition of this invention (Composition D) was rapid in initial effect and did not over-neutralize.

EXAMPLE 9

When, in the procedure of Example 2, 1% by weight of calcium gluconate is substituted for magnesium gluconate, a fluid antacid suspension is obtained which has a neutralizing capacity of greater than 100 minutes as determined by the above-described titration procedure.

EXAMPLE 10

When, in the procedure of Example 2, 1% by weight of sodium gluconate is substituted for magnesium gluconate, a fluid antacid suspension is obtained which has a neutralizing capacity of greater than 100 minutes as determined by the above-described titration procedure.

EXAMPLE 11

When, in the procedure of Example 2, 1% by weight of potassium gluconate is substituted for magnesium gluconate, a fluid antacid suspension is obtained which has a neutralizing capacity of greater than 100 minutes as determined by the above-described titration procedure.

EXAMPLE 12

*Preparation of antacid solids*

An antacid suspension containing 4% by weight of aluminum hydroxide, 4% by weight of magnesium hydroxide, 1% by weight of magnesium gluconate, and 91% by weight of water was prepared according to the procedure of Example 2; and stored for 2 weeks at room temperature. The suspension was then dried in a vacuum oven at 50° C. 532 mg. of the resulting antacid solids had a neutralizing capacity of 85 minutes as determined by the above-described titration procedure.

Thus, it is apparent from the foregoing description that the objects of this invention have been attained. An aqueous antacid suspension has been invented which has high neutralizing capacity, and is rapid in initial effect without causing an excessive pH rise, and additionally, the antacid composition is palatable and non-systemic. In addition, novel methods of treating gastric hyperacidity and stabilizing antacid compositions have been invented.

While this invention has been described and exemplified in terms of its preferred embodiment, those skilled in the art will appreciate that modifications can be made without departing from the spirit and scope of this invention.

We claim:

An aqueous antacid suspension which comprises water, about 4 percent by weight of aluminum hydroxide, about 4 percent by weight of magnesium hydroxide, and about 1.0 percent by weight of magnesium gluconate.

References Cited

UNITED STATES PATENTS 3,200,136   8/1965   Grossmith _____ 167—55

ALBERT T. MEYERS, *Primary Examiner.*

SAM ROSEN, *Examiner.*

S. J. SINGER, S. J. FRIEDMAN, *Assistant Examiners.*